US012730620B1

(12) United States Patent
Purohit

(10) Patent No.: US 12,730,620 B1
(45) Date of Patent: Sep. 8, 2026

(54) SYSTEM AND METHOD DYNAMICALLY ORCHESTRATING DEPLOYMENT PIPELINE FOR DEPLOYING CLOUD APPLICATIONS

(71) Applicant: Wesco Digital Solutions (Ireland) Limited, Dublin (IE)

(72) Inventor: Dharmayu Purohit, Dublin (IE)

(73) Assignee: Wesco Digital Solutions (Ireland) Limited, Dublin (IE)

( * ) Notice: Subject to any disclaimer, the term of this patent is extended or adjusted under 35 U.S.C. 154(b) by 0 days.

(21) Appl. No.: 19/411,760

(22) Filed: Dec. 8, 2025

(51) Int. Cl.
*G06F 9/445* (2018.01)
*G06F 8/60* (2018.01)
*G06F 8/71* (2018.01)
*G06F 11/3668* (2025.01)

(52) U.S. Cl.
CPC .................. *G06F 8/60* (2013.01); *G06F 8/71* (2013.01); *G06F 11/3668* (2013.01)

(58) Field of Classification Search
CPC ......................................................... G06F 8/60
USPC .......................................................... 717/174
See application file for complete search history.

(56) References Cited

U.S. PATENT DOCUMENTS

| | | | | |
|---|---|---|---|---|
| 10,355,950 | B2 * | 7/2019 | Tseitlin | H04L 41/5096 |
| 11,030,071 | B2 * | 6/2021 | Mosquera | H04L 43/16 |
| 11,726,894 | B2 * | 8/2023 | Jain | G06F 11/3452 709/224 |
| 11,842,214 | B2 * | 12/2023 | Choochotkaew | G06F 9/5005 |
| 12,014,159 | B2 * | 6/2024 | Shpilyuck | G06F 9/5038 |
| 2017/0180266 | A1 * | 6/2017 | Frank | H04L 67/51 |
| 2017/0180487 | A1 * | 6/2017 | Frank | G06F 11/3688 |
| 2019/0340512 | A1 * | 11/2019 | Vidal | G06F 11/3692 |
| 2023/0237165 | A1 * | 7/2023 | Prasad | G06N 20/20 726/26 |

* cited by examiner

*Primary Examiner* — Evral E Bodden
(74) *Attorney, Agent, or Firm* — K&L Gates LLP

(57) ABSTRACT

A device may monitor operational metrics of the deployment pipeline, the operational metrics indicative of an operational behavior of the deployment pipeline. A device may determine deployment entropy values indicative of a disorder level within the deployment pipeline, wherein the deployment entropy values are based on temporal variances in the monitored operational metrics associated with the deployment stages of the deployment pipeline. A device may evaluate the deployment entropy values against entropy bands associated with a set of action-selection criteria. A device may execute an adaptive pipeline pathing of the cloud application through the plurality of deployment stages by selecting and executing deployment control actions based on the evaluation of the deployment entropy values against the entropy bands.

15 Claims, 7 Drawing Sheets

SYSTEM AND METHOD DYNAMICALLY ORCHESTRATING DEPLOYMENT PIPELINE FOR DEPLOYING CLOUD APPLICATIONS

TECHNICAL FIELD

The present disclosure relates generally to automated software deployment, and more particularly to computer-implemented methods and systems for dynamically orchestrating continuous integration and continuous deployment (CI/CD) pipelines in cloud environments based on real-time risk and interdependence metrics.

BACKGROUND

Modern cloud-native applications are often constructed as large ensembles of microservices, each with its own configuration, dependencies, and deployment workflows. Traditional CI/CD pipelines execute these workflows in a rigid, linear manner—compiling code, running tests, packaging artifacts, and deploying to target environments—without regard to real-time variability in performance, configuration drift, or cross-service entanglement. As application complexity grows, this inflexible approach can lead to brittle deployments, undetected configuration mismatches, and cascading failures that impact uptime and developer velocity, deployment performance, predictability, and software stability.

To mitigate such risks, many organizations introduce manual gates or static policy checks—such as requiring minimum test coverage, enforcing configuration templates, or gating promotions on manual approval. While these measures can prevent obvious errors, they do not adapt to changing conditions in the deployment pipeline, such as sudden spikes in deployment latency, intermittent test failures, or hidden service coupling introduced by new feature flags. As a result, pipelines either move too slowly—hindering rapid iteration—or too hastily—propagating unstable changes into production.

Some solutions attempt to introduce feedback loops by collecting telemetry on build durations, error rates, and resource utilization. However, most remain limited to dashboarding or alerting; they lack automated, runtime-driven control over the deployment pipeline's progression. There remains a need for an adaptive orchestration mechanism that can quantify pipeline "risk" and "interdependence" in real time and then automatically adjust deployment behavior—such as throttling concurrency, triggering canary rollouts, or performing rollbacks—to improve reliability and efficiency without manual intervention.

SUMMARY

In various embodiments, the present disclosure provides a computer-implemented method for dynamically orchestrating a deployment pipeline for deploying a cloud application, wherein the deployment pipeline comprises deployment stages each configured to perform one or more deployment operations. The computer-implemented method comprises: monitoring operational metrics of the deployment pipeline, the operational metrics indicative of an operational behavior of the deployment pipeline; determining deployment entropy values indicative of a disorder level within the deployment pipeline, wherein the deployment entropy values are based on temporal variances in the monitored operational metrics associated with the deployment stages of the deployment pipeline; evaluating the deployment entropy values against entropy bands associated with a set of action-selection criteria; and executing an adaptive pipeline pathing of the cloud application through the plurality of deployment stages by selecting and executing deployment control actions based on the evaluation of the deployment entropy values against the entropy bands.

Implementations of the computer-implemented method include one or more of the following features. The operational metrics may comprise at least one of: a deployment latency value for each deployment stage; or a failure rate computed based on success or error outcomes associated with the deployments stages of the deployment pipeline. The deployment control actions may comprise at least one of: adjusting a concurrency level for deployment tasks; modifying a retry interval for failure-prone stages; or reordering execution of non-dependent deployment stages to reduce end-to-end latency. Determining the deployment entropy values may comprise: determining a configuration drift value indicative of inconsistencies across multiple of the deployment stages of the deployment pipeline. Determining the deployment entropy values may comprise: determining an environmental inconsistency value (EI) indicative of defects or test failures repeating in one or more of the deployment stages of the deployment pipeline. Determining the deployment entropy values may comprise: determining a deployment randomness value (DR) indicative of a count of deployments that fail reproducibility from a common source commit. Determining the deployment entropy values may comprise: determining a configuration obsolescence value (CO) indicative of outdated, hardcoded, or deprecated configuration patterns in the deployment pipeline. The deployment control actions may comprise at least one of: pausing deployment; executing defined and quantified retries; accelerating deployment; initiating rollback to a prior stable deployment stage; adjusting deployment parameters for subsequent deployment stages; or invoking a canary deployment for a subset of target environments based on a deployment entropy value deviating from a dynamically adjustable threshold by a first margin. Computing the deployment entropy values may comprise applying an equation defined as:

$$DEV = \frac{CD + EI + DR + CO}{N}$$

wherein DEV is the Deployment Entropy value, CD is Configuration Drift Value, EI is an environmental inconsistency value, a configuration drift value, an environmental inconsistency value, DR is a deployment randomness value, CO is a configuration obsolescence value, and N is a normalizing constant greater than zero. The monitored operational metrics may be indicative of at least one of: inconsistencies across multiple of the deployment stages of the deployment pipeline; defects or test failures repeating in one or more of the deployment stages of the deployment pipeline; a count of deployments that fail reproducibility from a common source commit; or outdated, hardcoded, or deprecated configuration patterns in the deployment pipeline. The computer-implemented method may further comprise: obtaining dependency data indicative of relationships among components of the deployment pipeline; and determining a coupling value based on the dependency data; and wherein executing an adaptive pipeline pathing of the cloud application is further based on the coupling value. The dependency data may comprise: a direct dependency parameter indicative of direct service-to-service or service-to-tool references among components of the deployment pipeline, wherein the direct dependency parameter is based on the obtained dependency data. The dependency data may comprise: an environment touch parameter indicative of distinct deployment environments affected by changes to at least one of the components of the deployment pipeline. The dependency data may comprise: a test linkage parameter indicative of integration or end-to-end test cases referencing two or more of the components of the deployment pipeline. The dependency data may comprise: an infrastructure component parameter indicative of infrastructure resources, including at least one of databases, message buses, or storage buckets, associated with the components of the deployment pipeline. The dependency data may comprise: a configuration alignment parameter indicative of shared configuration parameters or feature-flag values concurrently referenced by two or more of the components of the deployment pipeline.

In various embodiments, the present disclosure provides a computer-implemented method for dynamically orchestrating a deployment pipeline for deploying a cloud application, wherein the deployment pipeline comprises a plurality of deployment stages each configured to perform one or more deployment operations to the cloud application. The method comprises: obtaining dependency data, the dependency data comprising engagement parameters among components of the deployment pipeline; computing a coupling value based on the engagement parameters, wherein the coupling value is indicative of an interdependence level among components of the deployment pipeline; evaluating the coupling value to derive interdependence inferences at each of the plurality of deployment stages; deriving interdependence inferences based on the evaluation of the coupling value at each of the plurality of deployment stages; and executing an adaptive pipeline pathing of the cloud application through the plurality of deployment stages by selecting and executing deployment control actions based on the derived interdependence inferences. The plurality of engagement parameters may at least one of: a direct dependency parameter indicative of direct service-to-service or service-to-tool references among the plurality of components, wherein the direct dependency parameter is based on the obtained dependency data; an environment touch parameter indicative of distinct deployment environments affected by changes to at least one of the plurality of components; a test linkage parameter indicative of integration or end-to-end test cases referencing two or more of the plurality of components; an infrastructure component parameter indicative of infrastructure resources, including at least one of databases, message buses, or storage buckets, associated with the plurality of components; or a configuration alignment parameter indicative of shared configuration parameters or feature-flag values concurrently referenced by two or more of the plurality of components. The deployment control actions may comprise at least one of: accelerating advancement of the cloud application through the deployment pipeline based on proximity of a deployment entropy value to a dynamically-adjustable threshold; withholding advancement to a subsequent deployment stage in the deployment pipeline based on the proximity of the deployment entropy indicator to the dynamically-adjustable threshold; automatically gating advancement of the cloud application through the deployment pipeline based on the proximity of the deployment entropy indicator to the dynamically-adjustable threshold; or invoking a rollback routine, comprising: identifying a previous deployment stage associated with a stored deployment entropy indicator lower than or equal to a defined threshold; and reverting the cloud application to a previous deployment state.

In various embodiments, the present disclosure provides a computer-implemented method for dynamically orchestrating a deployment pipeline for deploying a cloud application, wherein the deployment pipeline comprises a plurality of deployment stages each configured to perform one or more deployment operations to the cloud application. The method comprises: obtaining configuration state parameters associated with each deployment stage in the deployment pipeline; processing the configuration state parameters to determine deployment entropy values for the deployment pipeline, the deployment entropy values representative of an operational behavior of the deployment pipeline; and obtaining dependency data indicative of an entanglement level among components of the deployment pipeline; determining coupling values based on a plurality of engagement parameters at each of the deployment stages; executing, based on the deployment entropy values and the coupling values, an adaptive pipeline pathing of the cloud application through the plurality of deployment stages.

DESCRIPTION

Modern deployment pipelines for cloud applications—particularly those built on microservices and distributed infrastructure—are increasingly complex, dynamic, and fragile. Traditional CI/CD systems typically operate in a linear or rule-based manner, executing predefined sequences of deployment operations without accounting for real-time pipeline conditions, configuration drift, or cross-stage interdependencies. As a result, these systems are poorly equipped to adapt to runtime anomalies such as test flakiness, latency spikes, reproducibility failures, or service coupling that arises from shared resources, dependencies, or configuration values.

These limitations manifest in several critical challenges. First, the failure of one pipeline stage often leads to unnecessary cascading rollbacks or stalled deployments, even when corrective action could have been applied earlier or targeted more precisely. Second, existing systems lack the ability to quantify and respond to dynamic risk patterns. Furthermore, pipeline latency and reliability suffer because pipelines cannot optimize their own behavior in response to operational signals, resulting in either over-conservative deployment gating or premature progression that leads to failure. Thus, there is a need for a deployment orchestration mechanism that can monitor pipeline health in real time, quantify operational risk using interpretable indicators, and adaptively adjust pipeline control flows in response.

The present disclosure provides various methods and systems for dynamically orchestrating a cloud deployment pipeline. The deployment pipeline includes a plurality of deployment stages, each of which performs one or more deployment operations such as building, testing, packaging, or deploying software components. The orchestration may be based on the continuous analysis of operational signals and inter-component relationships. In some embodiments, the methods and systems enhance pipeline resilience and efficiency by continuously monitoring operational metrics and computing a deployment entropy indicator to detect instability, drift, or abnormal behavior during deployment.

Figure 1:
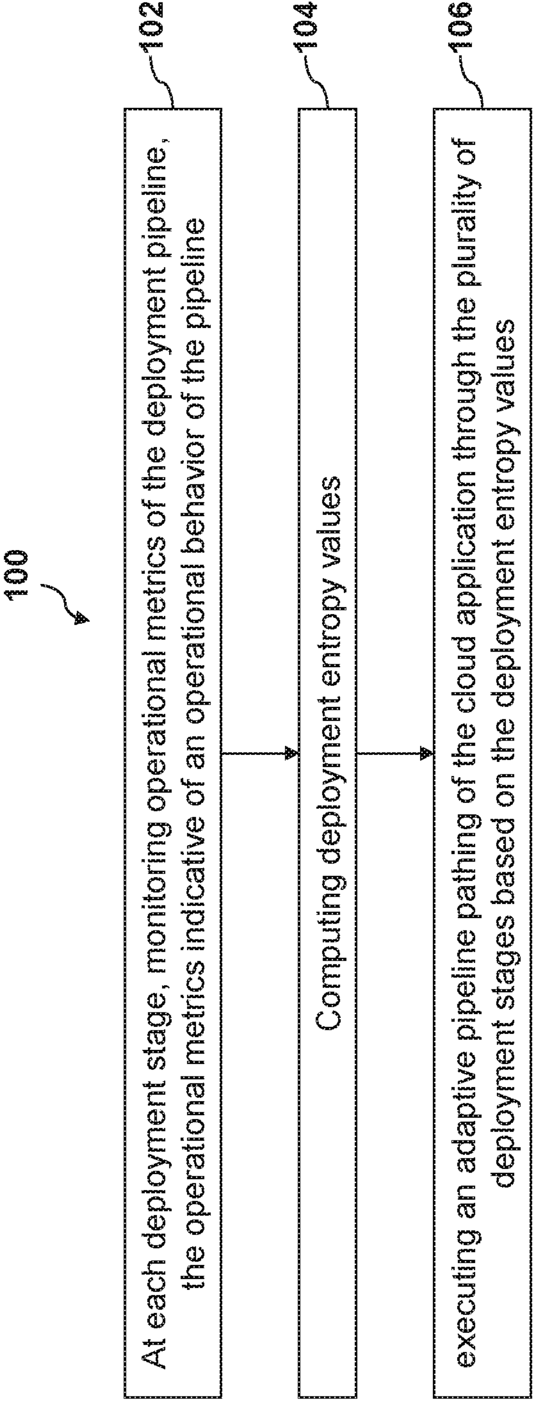
FIG. 1 is a flow diagram illustrating a computer-implemented method, in accordance with at least one embodiment of the present disclosure.

Referring to FIG. 1, a computer-implemented method 100 for dynamically orchestrating a deployment pipeline for deploying a cloud application. The deployment pipeline may include a plurality of deployment stages each configured to perform one or more deployment operations. The method 100 monitors 102 operational metrics of the deployment pipeline at one or more deployment stages of the deployment pipeline. The monitored operational metrics indicate an operational behavior of the deployment pipeline. These metrics may include, for example, deployment latency values for each stage and failure rates derived from success or error outcomes associated with deployment operations. Other metrics may include test stability, reproducibility, and consistency across stages. These values may be collected in real time and serve as inputs for computing a health indicator of the deployment pipeline.

In at least one embodiment, the monitored operational metrics may indicate or represent inconsistencies across multiple deployment stages of the deployment pipeline. Additionally, or alternatively, the monitored operational metrics may indicate, or represent, defects or test failures repeating in one or more of the deployment stages of the deployment pipeline. Additionally, or alternatively, the monitored operational metrics may indicate, or represent, a count of deployments that fail reproducibility from a common source commit. Additionally, or alternatively, the monitored operational metrics may indicate, or represent, outdated, hardcoded, or deprecated configuration patterns in the deployment pipeline.

The method 100 further includes computing 104 deployment entropy values, as described in greater detail below. The deployment entropy values may indicate a disorder level within the deployment pipeline. The deployment entropy values may be determined based on the monitored operational metrics across deployment stages of the deployment pipeline. In at least one implementation, the deployment entropy values are determined based on temporal variances in the monitored operational metrics across deployment stages of the deployment pipeline.

The deployment entropy values may reflect temporal variability in operational metrics—such as latency, failure rates, configuration drift, environmental inconsistency, and deployment randomness—observed across different stages of the deployment pipeline, and may be derived from configuration state parameters and test or deployment outcomes, and serve as quantifiable proxies for pipeline instability or unpredictability.

The method 100 may further include executing 106 an adaptive pipeline pathing of the cloud application through the plurality of deployment stages based on the deployment entropy values. In at least one implementation, the deployment entropy values are evaluated against entropy bands or ranges 508 (FIG. 5) associated with a set of action-selection criteria. Executing 106 the adaptive pipeline pathing may comprise selecting and executing deployment control actions based on the evaluation of the deployment entropy values against the entropy bands.

Additionally, or alternatively, the computed deployment entropy values may be compared to a threshold, or a tolerance variance, which can be stored and accessed for the comparison. In at least one implementation, the threshold, or tolerance variance, can be dynamically adjustable.

Further to the above, the deployment control actions may include one or more of: pausing deployment, executing defined and quantified retries, accelerating deployment, initiating rollback to a prior stable deployment stage, adjusting deployment parameters for subsequent deployment stages, or invoking a canary deployment for a subset of target environments based on the deployment entropy indicator deviating from the dynamically adjustable threshold by a first margin.

In at least one embodiment, determining a deployment entropy value includes determining a configuration drift value indicative of inconsistencies across multiple of the deployment stages of the deployment pipeline. Additionally, or alternatively, determining the deployment entropy value may include determining an environmental inconsistency value (EI) indicative of inconsistent software stability across lower and higher environments, primarily due to uncontrolled or ungoverned configuration changes. Certain functional or non-functional test scenarios work correctly in lower environment but fail in higher environments. Additionally, or alternatively, determining the deployment entropy value may include determining a deployment randomness value (DR) indicative of a count of deployments that fail reproducibility from a common source commit. Additionally, or alternatively, determining the deployment entropy value may include determining a configuration obsolescence value (CO) indicative of outdated, hardcoded, or deprecated configuration patterns in the deployment pipeline.

In at least one embodiment, determining the deployment entropy value includes computing a configuration entropy parameter based on a configuration drift value, an environmental inconsistency value, a deployment randomness value, a configuration obsolescence value, and a normalizing constant greater than zero. In at least one implementation, determining the deployment entropy values is achieved by applying an equation defined as:

$$DEV = (CD + EI + DR + CO)/N$$

wherein DEV is the Deployment Entropy value, CD is Configuration Drift Value, EI is an environmental inconsistency value, a configuration drift value, an environmental inconsistency value, DR is a deployment randomness value, CO is a configuration obsolescence value, and N is a normalizing constant greater than zero.

In at least one embodiment, adjusting the deployment parameters based on a deployment entropy value includes adjusting a concurrency level for deployment tasks based on determined values of the entropy indicator. The method 100 may monitor real-time operational metrics—such as per-stage latency and failure rate—and, upon determining that the deployment entropy value has crossed a predefined threshold, increases or decreases the concurrency level for parallelizable deployment tasks. For example, when the deployment entropy value falls below a "low-risk" threshold, the method may double the number of parallel container image pulls or parallel Helm releases, thereby reducing overall pipeline duration. Conversely, if rising deployment entropy value suggests resource contention or test flakiness, the method may throttle concurrency—limiting the number of simultaneous tasks—to prevent cascading failures.

Additionally, or alternatively, adjusting the deployment parameters may include modifying a retry interval for failure-prone stages based on determined values of the deployment entropy value. The method 100 may modify the retry interval for failure-prone stages in response to observed instability. Rather than using a fixed back-off schedule, the method 100 may compute an adaptive retry interval based on the magnitude of the deployment entropy value relative to its threshold. For example, if the deployment entropy value exceeds the threshold by a moderate margin, the method may impose a short delay (e.g., 30 seconds) before reattempting a failed database schema migration; but when deployment entropy value is severely elevated, it may enforce a longer cool-down period (e.g., several minutes) to allow downstream systems to stabilize, logs to propagate, and operators to intervene if necessary. This adaptive retry mechanism reduces repeated rapid-fire failures that contribute to pipeline "noise" and entropy.

Additionally, or alternatively, adjusting the deployment parameters may include reordering execution of non-dependent deployment stages to reduce end-to-end latency, for example. This addresses scenarios where stages have optional, non-dependent tasks—such as canary health checks or integration tests with external services—that can be safely reordered without impacting correctness. The method 100 may include reordering execution of non-dependent deployment stages to minimize end-to-end latency or to isolate unstable tasks. For instance, if a long-running performance test historically exhibits intermittent failures and contributes disproportionately to pipeline entropy, the method 100 may defer that test until after a critical staging deployment has succeeded. Meanwhile, faster tests and compliance scans are executed first, providing early confidence and reducing the risk of blocking high-priority deployments, for example.

The dynamic adjustment of deployment parameters can be realized through a modular parameter-tuning engine integrated within the orchestration layer. This engine subscribes to entropy indicator events and consults a parameter-policy configuration, which maps entropy ranges to specific parameter values (e.g., concurrency=10, retry interval=60 s, reorder pattern=[A, C, B]). Parameter-policy configurations may be stored in a versioned configuration repository and updated via continuous feedback from pipeline analytics, enabling on-the-fly refinements without code changes. In at least one embodiment, the Parameter-policy configurations may be stored in a baseline configuration repository, which may also store the impact/criticality tagged configuration tolerance, and may define a tolerable configuration drift for pipeline to continue to execute with less likelihood of local or cascading failures.

By dynamically tuning concurrency, retry timing, and stage ordering, the method 100 provides a technical solution to the problem of static, one-size-fits-all pipeline settings. These embodiments reduce resource waste, prevent thrashing, and adaptively steer the deployment pipeline toward stable paths—thereby improving commit to deploy success rate and the speed and reliability of cloud application deployments.

In at least one embodiment, the deployment control actions include accelerating advancement of the cloud application through the deployment pipeline based on proximity of the deployment entropy indicator to the threshold. Additionally, or alternatively, the deployment control actions may include withholding advancement to a subsequent deployment stage in the deployment pipeline based on the proximity of the deployment entropy indicator to the threshold state. Additionally, or alternatively, executing the deployment control action may include automatically gating advancement of the cloud application through the deployment pipeline based on the deployment entropy indicator decreasing to or below the corresponding threshold. Additionally, or alternatively, executing the deployment control action may include invoking a rollback routine that includes identifying a previous deployment stage associated with a stored deployment entropy indicator lower than or equal to a defined threshold, and reverting the cloud application to the previous stable (e.g., complete and stably repeatable) deployment state. Additionally, or alternatively, executing the deployment control action may include invoking a canary deployment for a subset of target environments based on the deployment entropy indicator deviating from the dynamically adjustable threshold by a first margin.

Figure 2:
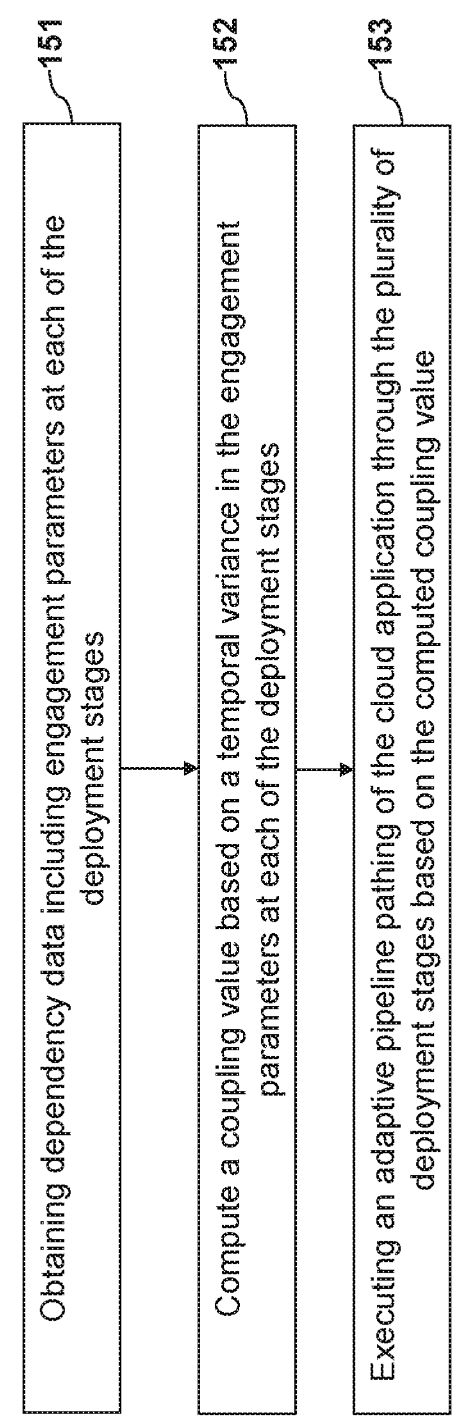
FIG. 2 is a flow diagram illustrating a computer-implemented method, in accordance with at least one embodiment of the present disclosure.

FIG. 2 is a block diagram illustrating a computer-implemented method 150 for quantifying and responding to service interdependence within a cloud deployment pipeline. In at least one embodiment, the method 150 obtains 151 dependency data that includes a set of engagement parameters characterizing interactions among services, environments, and tools at that stage. These parameters may include counts of direct service-to-service API calls, the number of distinct environments touched by a change, integration test linkage counts, shared infrastructure references (e.g., common databases or message buses), and co-referenced configuration keys or feature flags, for example. By collecting this data at each stage, the method 150 may build a time-series view of how tightly coupled the deployment pipeline's components are as the deployment progresses. Alternatively, the system coupling coefficient may be calculated once and then cumulatively factored in the tight coupling or lose coupling.

The method 150 may determine a direct dependency parameter by analyzing API call graphs or integration manifests to count service-to-service and service-to-tool references active at the current stage. The method 150 may calculate an environment touch parameter by recording each distinct deployment environment—such as development, staging, or production—to which the current component change is applied, and counting the number of unique environments affected.

Additionally, or alternatively, the method 150 may retrieve a configuration alignment parameter by accessing feature-flag services or configuration repositories and identifying configuration keys or values referenced by more than one component. Each shared configuration reference increases the configuration alignment count for the stage Additionally, or alternatively, the method 150 may derive a test linkage parameter by parsing test suite definitions and execution logs to identify any integration or end-to-end tests that reference two or more components. Each such multi-component test increments the test linkage count for the stage. The method 150 may also compute an infrastructure component parameter by querying infrastructure-as-code templates or cloud provider metadata APIs to determine which shared resources (databases, message buses, storage buckets, etc.) are used by multiple components during the stage. The count of these shared resources forms the infrastructure component parameter.

Once the engagement parameters have been gathered, the method 150 may proceed to compute 152 a coupling value (also referred to herein as System Coupling Coefficient (SCC)) based on the monitored engagement parameters. The coupling value is indicative of an interdependence level among components of the deployment pipeline. In one embodiment, the method 150 calculates stage-specific coupling scores by normalizing each engagement parameter against a known maximum (e.g., total services, total environments) and then aggregates them into a per-stage coupling value. A temporal variance function—such as the statistical variance or a weighted moving average—then measures how these coupling values fluctuate across successive stages. The output of this function may be a single numeric coupling value that represents the overall "tightness" and instability of dependencies throughout the deployment pipeline run.

Further to the above, the method 150 may executing 153 an adaptive pipeline pathing of the cloud application through the plurality of deployment stages based on the computed coupling value. In at least one implementation, the method 150 includes evaluating the coupling value at each deployment stage to derive interdependence inferences from the coupling value at each deployment stage, as illustrated below in Table 1. In such implementations, executing 153 an adaptive pipeline pathing may include selecting and executing deployment control actions, as described in connection with the method 100, based on the derived interdependence inferences.

In at least one implementation, the method 150 includes comparing the coupling value to a dynamically adjustable threshold used to indicate relative coupling levels across pipeline runs. This threshold may be initialized based on historical pipeline data, industry best practices, or manually configured policy values, and may be automatically recalibrated over time through trend analysis or machine-learning feedback. If the coupling indicator remains below the threshold, the deployment pipeline is considered to be operating under manageable dependency conditions; if it exceeds the threshold, the deployment pipeline is considered to be in excessive interdependence or potential risk. Based on the comparison, the method 150 may select and execute one of a plurality of deployment control actions.

In some embodiments, the System Coupling Coefficient (SCC) drives context-sensitive actions at multiple pipeline stages rather than triggering rollbacks. When the SCC indicates relatively low coupling with respect to the dynamic threshold, the method may accelerate pipeline execution, for example by fast-tracking subsequent stages or increasing concurrency. When the SCC approaches or exceeds the threshold, the method may dynamically insert additional checkpoints, enable enhanced verification steps, or delay progression until cross-environment consistency is confirmed. In certain implementations, the SCC is used to identify scenarios where two or more deployment environments must be identical or progressively improving with minimal coupling. If tight coupling is detected, the deployment pipeline may trigger additional integration tests, policy validations, or human-in-the-loop approval workflows to ensure the combined system remains a stable, deployable unit. Through these processor-implemented steps, the method 150 dynamically adapts the deployment pipeline in response to measured interdependence, thereby enhancing reliability and minimizing the impact of tightly coupled components.

In various embodiments, a hybrid method that combines parts of the methods 100 and 150 is implemented. The hybrid method may execute an adaptive pipeline pathing of a cloud application through the stages of the deployment pipeline, e.g., by selecting and executing one of the plurality of deployment actions, based on combined coupling and deployment entropy values.

In at least one embodiment, the hybrid method computes both a deployment entropy value and a coupling value for each pipeline run, and then compares each score to a corresponding threshold. The selection and execution of the deployment action may be based on the comparison of each value to a respective threshold.

Alternatively, the hybrid method may combine these values to form a composite risk score that guides control-action selection. After gathering engagement parameters at each stage and calculating the coupling value as described above, the method similarly collects operational metrics—such as stage latencies, failure rates, configuration drift values, and obsolescence scores—and computes a deployment entropy value via normalization and aggregation. Both values are then fused into a unified risk metric, for example by computing a weighted sum or by passing the two values as inputs into a secondary machine-learning model trained to predict pipeline failure probability. Once the composite risk score is available, the method compares it against one or more dynamically adjustable thresholds.

In one implementation, a two-dimensional threshold matrix is used: a lower bound below which the deployment pipeline is deemed low-risk, an intermediate band that triggers adaptive tuning actions, and an upper bound beyond which aggressive mitigation (such as rollback) is required. Alternatively, a single scalar threshold may be applied to the composite score, with different control actions mapped to discrete score ranges.

Based on this comparison, the method selects one of the plurality of deployment control actions. If the composite risk score falls within the low-risk region, the system may accelerate deployment by increasing concurrency or by skipping non-critical gates. If the score lies in the intermediate region, the system may adjust deployment parameters, such as throttling retries, reordering non-dependent stages, or invoking a canary rollout to a limited environment. Finally, if the score exceeds the high-risk threshold, the system may gate further progression—requiring human approval or additional deep-scan gates—or initiate a rollback to the last known stable state.

To ensure responsiveness and stability, the method continuously monitors both entropy and coupling indicators throughout the deployment. If the composite risk score changes—either improving or deteriorating—the system may re-evaluate its selected action. For instance, a rollback may be aborted and replaced with a canary deployment if the risk score drops back below the high-risk threshold, or parameter adjustments may be escalated to a full gate if the score climbs unexpectedly during canary execution.

Figure 2A:
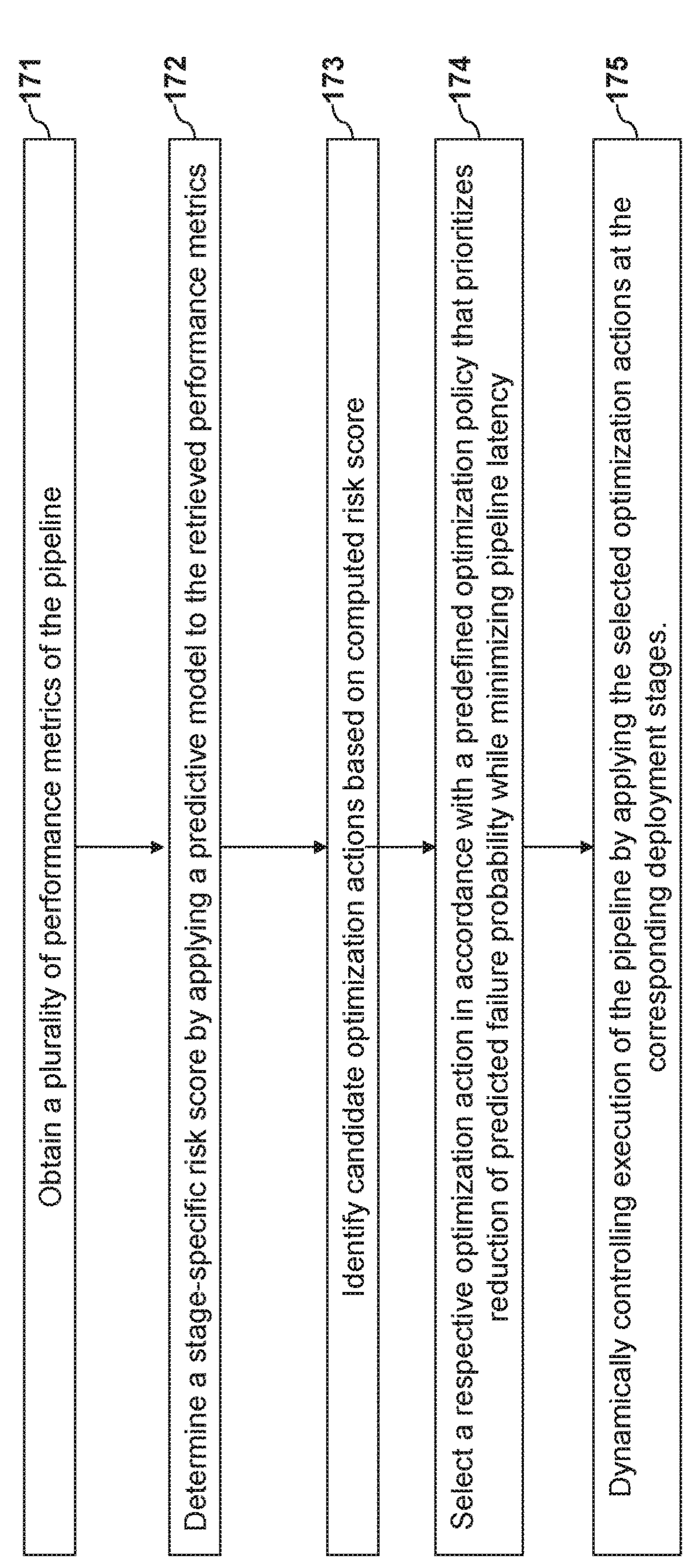
FIG. 2A is a flow diagram illustrating a computer-implemented method, in accordance with at least one embodiment of the present disclosure.

FIG. 2A illustrates a computer-implemented method 170 for failure mitigation in a software deployment pipeline. The method 170 includes obtaining 171 a plurality of performance metrics that characterize each deployment stage's historical and real-time behavior. These metrics may include, without limitation, historical error rates (the proportion of failed operations over total attempts), test coverage percentages (the ratio of exercised code paths in unit and integration tests), code complexity scores (such as cyclomatic complexity or maintainability indices), artifact sizes (for example, container image or binary package sizes), and build durations (the elapsed time for compiling, packaging, and containerizing). Performance metrics are retrieved from logging systems, test frameworks, and artifact registries and stored in a non-transitory memory for immediate analysis.

The method 170 further includes determining 172 a stage-specific risk score by applying a predictive model to the collected metrics. The predictive model may be a statistical or machine-learning algorithm—such as a gradient-boosted decision tree, support vector machine, neural network, or Cox proportional hazards model-trained on prior pipeline execution outcomes. During a training phase, the model ingests historical metric vectors paired with observed failure or success labels to learn the relationships between performance indicators (e.g., high failure rates or large artifact sizes) and pipeline stage failures. At runtime, the trained model consumes the current stage's metrics and outputs a risk score (for example, a probability between 0 and 1) that quantifies the likelihood of failure if the deployment pipeline were to proceed without further intervention.

Upon computing the risk score, the method 170 identifies 173 one or more candidate optimization actions designed to mitigate the predicted failure risk. These actions may include, for instance, inserting an additional validation test (such as a deeper security scan or extended integration test), increasing resource allocation (for example, provisioning extra CPU or memory for build agents), scheduling a canary deployment (to roll out the change to a limited subset of environments before full promotion), or delaying progression (imposing a cool-down interval to allow system stabilization or operator review). Candidate actions may be generated by mapping risk-score ranges to preconfigured action sets stored in a policy repository or by invoking a secondary decision module that suggests actions based on cost-benefit analyses.

The method 170 then selects 174 a respective optimization action in accordance with a predefined optimization policy that balances reducing predicted failure probability and minimizing pipeline latency. The optimization policy may encode priorities—such as favoring lightweight tests over full rollbacks in low-to-moderate risk scenarios, or reserving canary deployments for high-risk stages where downstream impact is severe. In at least one embodiment, selection logic may be implemented as a rule-based engine, a decision tree, or as part of the same machine-learning framework that produced the risk score, ensuring that action choices are both context-aware and aligned with organizational deployment goals.

The method 170 may dynamically control 175 execution of the deployment pipeline by applying the selected optimization actions at the corresponding deployment stages. For example, if the chosen action is to insert an additional validation test, the deployment pipeline control plane injects the test into the execution graph before proceeding; if the action is to increase resource allocation, the orchestrator adjusts the parallelism or agent sizing in the job scheduler; if a canary deployment is selected, the system provisions a limited subset of target environments and monitors their health before promoting to full rollout; and if a delay is chosen, the deployment pipeline pauses for the specified interval.

Figure 3:
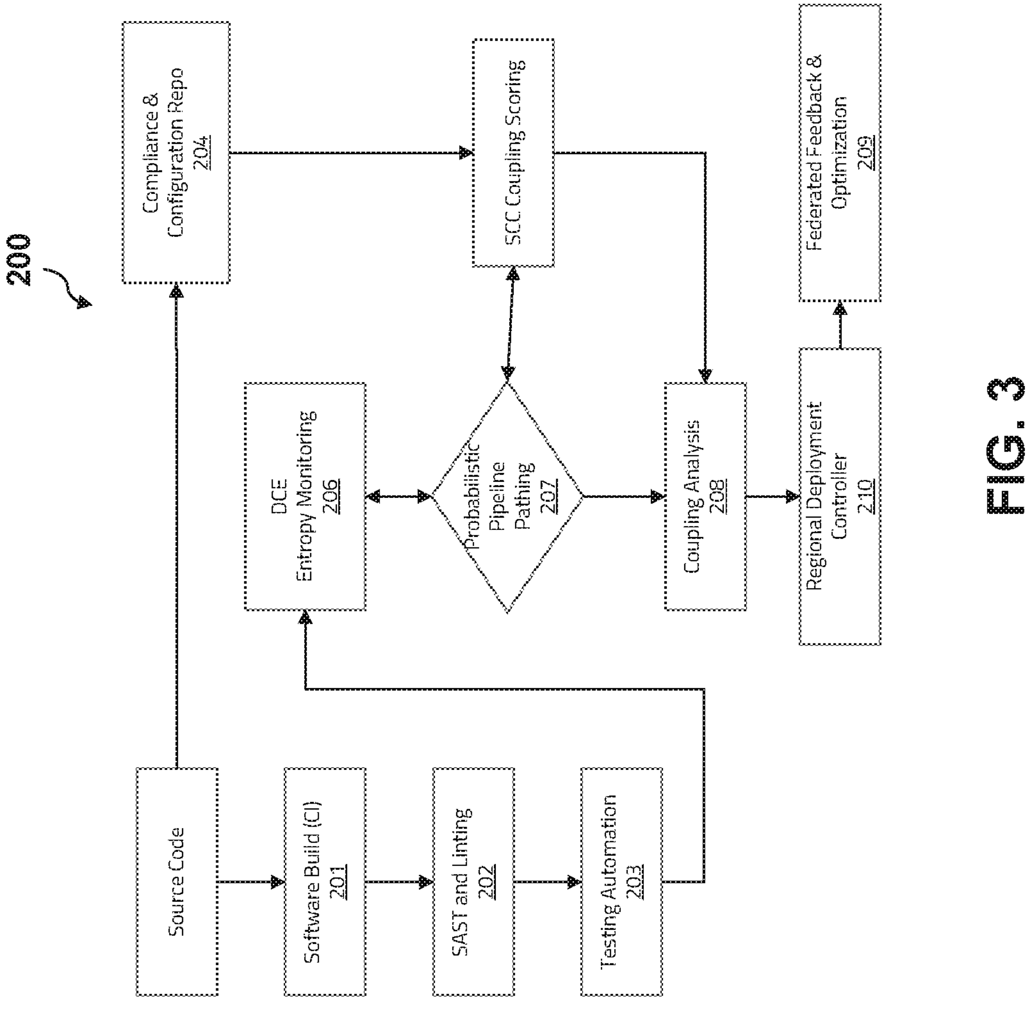
FIG. 3 illustrates a system, in accordance with at least one embodiment of the present disclosure.

Referring to FIG. 3, a Digital Deployer system 200, in accordance with at least one embodiment of the present disclosure. The system 200 may implement one or more parts of the method 100, the method 150, and/or the hybrid method based on the methods 100, 150. In at least one embodiment, the system 200 includes source code build module 201 that ingests application source code from version control (e.g., Git) and performs language-specific compilation or assembly tasks. For interpreted languages, it may validate syntax and bundle source files; for compiled languages, it may execute compiler toolchains to produce binaries or bytecode. Artifacts are then packaged (e.g., into Docker build contexts) and pushed to a centralized artifact registry. The build process emits metadata—such as commit hashes, build timestamps, and dependency manifests—that downstream modules consume for traceability.

Additionally, the system 200 may include an SAST and Linting Module 202. Upon receipt of each code snapshot or artifact, the module 202 may execute static application security testing (SAST) tools (e.g., Veracode, SonarQube) and style/lint linters specific to the application's language and framework. Violations—security vulnerabilities, code smells, or style infractions—are recorded in structured reports. These reports feed back into the deployment pipeline's dashboard and gate criteria in the Compliance & Configuration Repository, preventing further progression until critical issues are remediated.

Furthermore, the system 200 may further include a testing automation module 203 that orchestrates execution of unit, integration, and end-to-end test suites against the build artifacts. The module 203 may dynamically allocate test runners (containers or VMs), retrieve binaries from the artifact registry, and execute tests in isolated environments. Test results—including pass/fail statuses, code coverage metrics, and performance benchmarks—may be normalized into a common format and forwarded to the Probabilistic Pipeline Pathing engine to inform routing decisions.

In some embodiments, the system 200 includes a Compliance and Configuration Repository 204 that serves as a centralized, version-controlled store for policy-as-code artifacts. This repository may store declarative configuration blueprints, such as orchestration platform manifests, Helm charts, and infrastructure-as-code templates. It may also store enforcement policies that define compliance thresholds, such as minimum test coverage, approved runtime configurations, and container security policies (e.g., disallowing containers from running as root).

The repository 204 may expose one or more application programming interfaces (APIs) that enable pipeline components to query approved configurations and validation rules. For example, prior to deploying an application, the system 200 may retrieve the appropriate Helm chart template and verify that it adheres to the latest compliance baseline. The repository 204 may also supply gate definitions, which determine whether a pipeline stage may proceed or must halt based on the state of a deployment artifact or operational metric. These gate rules may be enforced by downstream components, including the entropy computation engine and the routing module.

The system 200 may include a DevOps Configuration Entropy (DCE) Monitoring module 206 that continuously, or at set intervals, computes a configuration entropy score indicative of "disorder" in the deployment pipeline. The module 206 ingests multiple forms of configuration data and telemetry, including drift logs (e.g., diffs between infrastructure-as-code definitions and deployed state), environmental mismatches (e.g., discrepancies between staging and production environments), and deployment irregularities (e.g., unscheduled rollbacks or manual patching events).

For each pipeline run, the module 206 aggregates these observations into one or more submetrics, such as configuration drift values, inconsistency scores, or randomness indicators. These values are normalized by the total number of configuration elements (e.g., environment variables, secrets, Helm values) and combined to produce a deployment entropy score. The resulting value may be stored as a numerical indicator that represents the level of uncertainty, inconsistency, or instability present in the current pipeline execution. Spikes in the entropy score may automatically trigger alerts or affect pipeline progression decisions, ensuring that risky or inconsistent changes receive additional validation or scrutiny.

The system 200 may also include a Coupling Analysis module 208 that computes a System Coupling Coefficient (SCC) representing the degree of interdependence among services, tools, and infrastructure components within the deployment pipeline. The module 208 may analyze both static and runtime artifacts to extract dependency information. Inputs to this analysis may include service dependency graphs, environmental touchpoints (e.g., the number of deployment environments affected by a component), test linkage counts (e.g., shared integration or end-to-end tests), shared infrastructure references (e.g., common databases or message buses), and configuration alignment metrics (e.g., shared secrets or feature flags).

These inputs are aggregated into a composite score that reflects the tightness of coupling among pipeline components. A high SCC score may trigger automated responses such as inserting integration tests, enabling human-in-the-loop reviews, or reconfiguring deployment boundaries to improve modularity. The SCC is also used as an input to the Probabilistic Routing function, allowing the system to reduce deployment risk in highly entangled service topologies.

In at least one embodiment, the module 208 may retrieve, or determine, engagement parameters for the current deployment stage. The engagement parameters may include: (1) a direct dependency count reflecting the number of explicit service-to-service or service-to-tool references; (2) an environment touch count representing the number of distinct deployment environments impacted by the stage's changes; (3) a test linkage count indicative of integration or end-to-end tests that involve multiple components; (4) an infrastructure component count tallying shared resources such as databases, message buses, or storage buckets; and (5) a configuration alignment count measuring concurrent references to the same configuration keys or feature-flag values across components.

Additionally, the module 208 may normalize each parameter by dividing by a predetermined maximum (for example, the total number of known services, environments, tests, infra resources, or configuration keys). The normalized values are then summed to produce a raw coupling score for the stage. To enable comparison across stages and application types, the raw score may be further divided by a normalization factor (N) corresponding to the maximum possible sum of engagement parameters, yielding a standardized SCC value between 0 and 1 (or another fixed range).

After calculating SCC for each stage, the module 208 may apply a temporal aggregation—such as averaging or a weighted moving average—across the sequence of stage-specific SCC values to derive an overall coupling indicator for the deployment pipeline run. The temporal view captures not only the intensity of coupling at individual stages but also how coupling evolves as the deployment progresses, highlighting "hot spots" where entanglement spikes.

The computed SCC value is then compared, by the module 208, against one or more thresholds that define acceptable coupling levels. If the SCC remains below a low-coupling threshold, the deployment pipeline may proceed without additional gating. If the SoC crosses a moderate-coupling threshold, the orchestrator may automatically insert decoupling actions such as additional integration tests or require human-in-the-loop approval. When SCC exceeds a high-coupling threshold, more drastic measures—like pausing progression, triggering rollback to a previously low-coupling state, or invoking targeted refactoring workflows—are executed to prevent tightly entangled changes from compromising system stability. In adaptive orchestration embodiments, the SCC module feeds its real-time values into a Probabilistic Pipeline Pathing engine 207 alongside other signals. Table 1 illustrates example insights and actions based on CC values associated with various pipeline states.

TABLE 1

| Pipeline Stage | SSC Value Influence | Insights | Actionability |
|---|---|---|---|
| Commit | Detect high-impact changes | Tightly entangled changes signal high SCC-flag them for more rigorous review or isolation. | Flag for review. |
| Build | Analyze dependencies | Track build dependencies across modules. Analyze dependency graphs (e.g., Maven/Gradle modules, package imports) | Auto-score SCC. |
| Security | Identify multi-touch dependencies | A service coupled to many endpoints (e.g., APIs, DBs) is more vulnerable and harder to secure. | Prioritize checks. |
| Testing | Link SCC to test granularity | Unit Tests: Lower SCC → better isolated units. Integration Tests: High SCC → test clusters of services together. | Adjust test coverage. |
| Environment | Check config and data interdependence | Dev/QA/Staging/Prod: SCC can track how similar or dependent environments are. | If a change in QA breaks staging, they're tightly coupled. Decoupling |

TABLE 1-continued

| Pipeline Stage | SSC Value Influence | Insights | Actionability |
|---|---|---|---|
| | | | strategy follows. |
| Deployment | Decide rollout strategy | The higher the SCC, the more conservative the deployment strategy should be. | Prefer safe deployment for high SCC. |

In at least one embodiment, the system 200 implements a Probabilistic Pipeline Pathing engine 207 that serves as the core decision-making module for pipeline orchestration. The engine 207 ingests runtime signals and telemetry—including the computed DCE score, the computed coupling indicator (e.g. a System Coupling Coefficient (SCC)), Risk Signal (a real-time, machine learned estimate of the likelihood that the deployment pipeline (or a particular stage) will fail or encounter an error if it proceeds as is), recent changes in error rate (ΔErrorRate), and historical edge-transition data ($E_{ij}$)—and applies a routing function of the form:

$$P(\text{stage}_i) = f(E_{i,j}, DCE, \Delta ErrorRate, \text{Risk Signal})$$

The routing function assigns a probability to each candidate next stage of the deployment pipeline based on the current operational context. The deployment pipeline then branches dynamically based on the stage with the highest computed probability. Example outcomes may include inserting a deep security scanning stage, initiating a canary deployment, or fast-tracking low-risk changes to production. This probabilistic routing approach replaces rigid, rule-based pipeline flows with an adaptive system 200 that reacts to the specific conditions of each deployment run by adaptively selecting a next stage of the deployment pipeline based on measured criteria. Table 2 provides example observed signals and corresponding pipeline paths based on example scenarios.

TABLE 2

| Scenario | Observed Signals | Pipeline Path |
|---|---|---|
| High SCC (0.88), medium DCE (1.7) | Stable errors | Insert “Deep Test” gate |
| Spike in ΔErrorRate, DCE = 3.4 | Canary deploy pending | Auto-branch into “Config Validation” |
| Low DCE, high coverage, low SCC | Clean metrics | Skip deep test, fast-track to canary |

A regional deployment controller 210 may be responsible for executing deployment operations in target environments, such as regional cloud clusters or orchestration platform namespaces. Upon receiving orchestration instructions, the controller 210 retrieves the relevant container images, Helm charts, and deployment parameters from secure storage and applies them to the appropriate infrastructure using platform-native tooling (e.g., Helm CLI, kubectl, or cloud-provider APIs).

The controller 210 may also perform post-deployment health checks, including readiness and liveness probes, synthetic transactions, or service-level objective (SLO) validations. If a deployment fails to meet expected health criteria, the controller may trigger an automated rollback to the most recent successful deployment state. Alternatively, when validation succeeds, the system may promote the deployment to production or trigger cross-region replication. The controller 210 integrates with both a Feedback module and a Routing module to support adaptive deployment flows.

A federated feedback and optimization module 209 may aggregate telemetry data from all deployment runs and regions. Collected signals may include pipeline success rates, stage-by-stage latency, resource consumption, and post-deployment service-level indicators (SLIs). This telemetry is stored in a central analytics store and may be used to support model training and policy refinement.

In some embodiments, the system 200 employs machine learning models—such as reinforcement learners or Bayesian optimizers—to analyze the aggregated telemetry and adjust routing policies, entropy thresholds, or resource allocation strategies. For example, if certain pipeline configurations consistently result in lower entropy and higher success rates, the system may bias routing probabilities toward those configurations. Updated control parameters and model weights are periodically fed back into the DCE Monitoring, SCC Scoring, and Probabilistic Routing modules, enabling a self-optimizing feedback loop that continuously improves deployment reliability, efficiency, and responsiveness over time.

Figure 4:
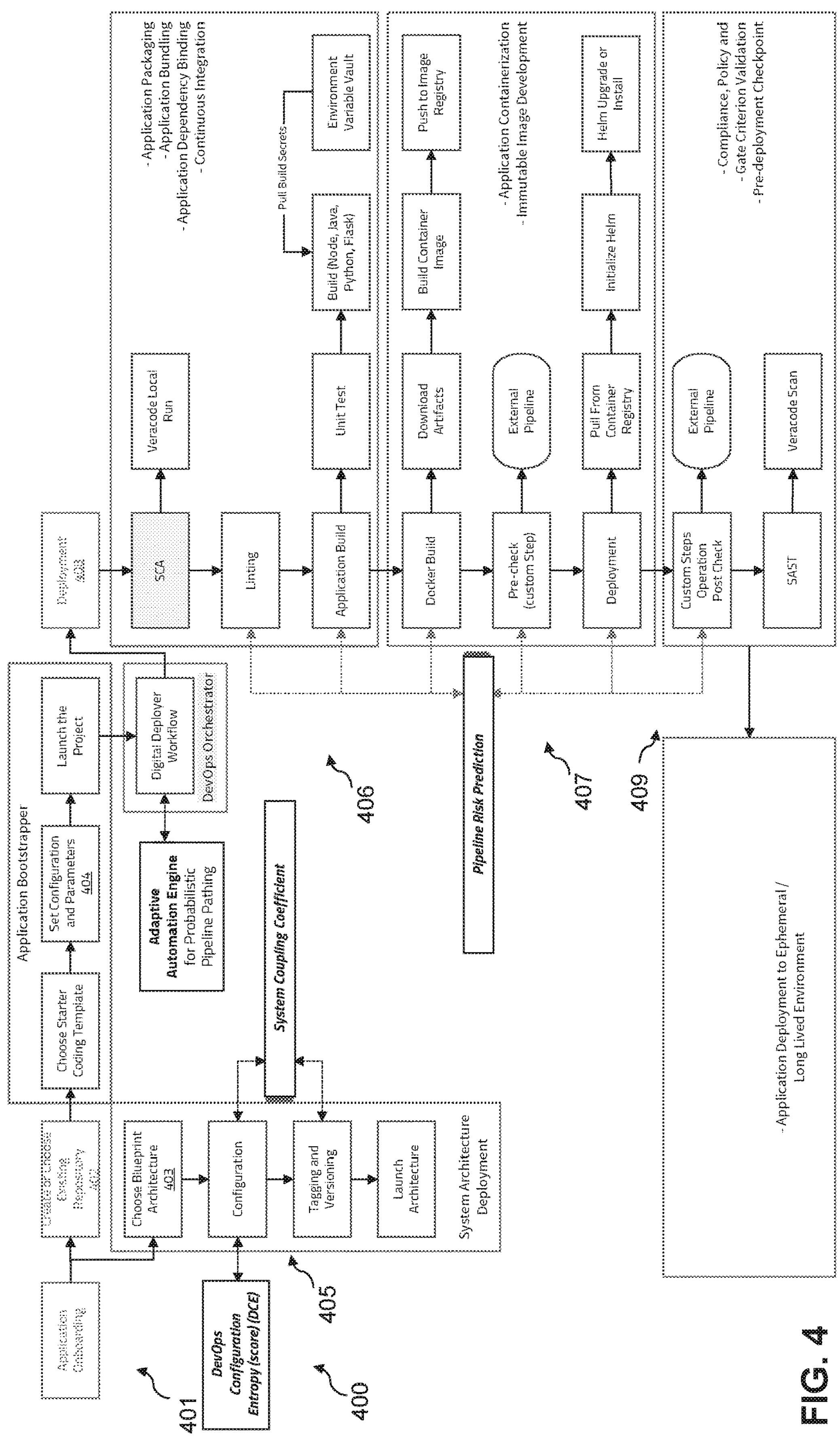
FIG. 4 illustrates a workflow of a pipeline, in accordance with at least one embodiment of the present disclosure.

FIG. 4 illustrates a pipeline deployment workflow 400 that executes, or implements, one or more of the previously described methods. The workflow 400 may be implemented as a sequence of processor-executed stages, each of which is responsible for a specific subset of deployment operations. In one embodiment, the workflow 400 begins with an Application Onboarding stage 401, wherein the system receives a request to onboard a new cloud application. During onboarding, the processor creates or clones a version-controlled repository 402, applies an initial template or blueprint selected from a set of predefined project types 403, and prompts a user or automated policy engine to supply parameters such as runtime framework 404, resource quotas, and default environment variables. Metadata describing the onboarded application—including repository URL, chosen template, and parameter set—is recorded in a deployment manifest for later use by downstream stages.

Following onboarding, a Configuration & Versioning stage is executed 405. The processor retrieves the deployment manifest and applies a tagging scheme (e.g., semantic versioning or date-based tags) to both the application code and its associated configuration blueprints. The system then stores the tagged configuration artifacts—such as Helm chart versions or infrastructure-as-code templates—in a centralized Compliance & Configuration Repository. This repository maintains an auditable history of configuration versions, enabling later stages to reference or rollback to any prior state. In parallel, the system may compute a configuration drift snapshot by comparing the newly committed templates to the currently deployed state in each environment, flagging any discrepancies for review.

In the Build stage 406, the processor executes a language-specific build pipeline that compiles source code, runs unit tests, and packages the result as deployable artifacts. For example, the system may invoke a specific build to generate binaries, then assemble a Docker build context containing the artifacts and configuration files. The build stage also publishes intermediate results—such as code-coverage reports, static-analysis summaries, and dependency manifests—to an artifact registry and telemetry store. Upon successful build and verification, the system pushes the Docker image (tagged with the version from the previous stage) to a container registry, making it available to later stages.

Once build artifacts are available, a Pre-Checks stage 407 performs environment-specific validations before actual deployment. The processor retrieves secrets and credentials from a secure vault, validates network and IAM policies against the Compliance & Configuration Repository gates, and executes custom scripts or policy-as-code rules (e.g., schema validation, CVE scanning). Only when all pre-checks pass does the system proceed; any failure in this stage will halt the deployment pipeline and emit diagnostic logs to the developer dashboard.

In the Deploy stage 408, the system may use a deployment orchestrator to apply the configuration and artifacts to the target cluster or environment. Post-deployment 409, the processor performs Post-Checks—including smoke tests, synthetic transactions, and health-check probes—and records success metrics. Based on these results and any configured Regional or External Pipeline hooks, the system may trigger additional deployments in secondary regions, invoke external CD tools, or integrate with canary-release managers for phased rollouts.

The deployment pipeline may conclude with Security & Compliance Scans, where deeper SAST, software composition analysis (SCA), and runtime security assessments are run against the live environment. Results from these scans feed back into the Compliance & Configuration Repository, updating policy baselines and gate definitions. In embodiments with adaptive orchestration, the computed metrics from each stage—build success rate, pre-check pass ratio, deployment latency, and scan severity distribution—are supplied to the Probabilistic Pipeline Pathing and DCE Monitoring modules. The feedback closes the loop, enabling the deployment pipeline to evolve over successive runs by adjusting thresholds, inserting or skipping stages, and optimizing resource allocations in response to observed performance and security characteristics.

Figure 5:
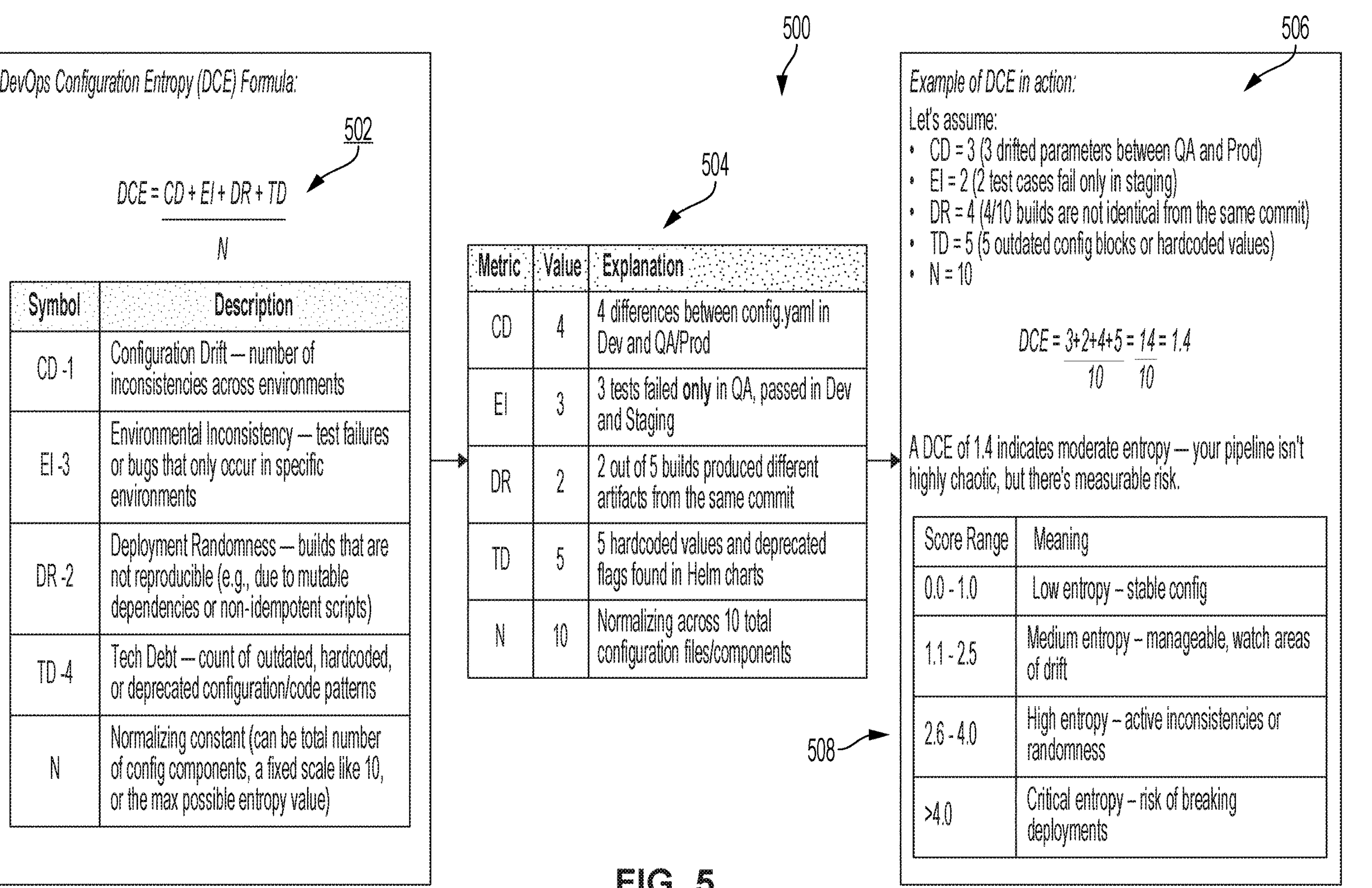
FIG. 5 illustrates a workflow of a DevOps Configuration Entropy (DCE) Monitoring module, in accordance with at least one embodiment of the present disclosure.

FIG. 5 illustrates a workflow 500 of the DevOps Configuration Entropy (DCE) Monitoring module 206, in accordance with at least one embodiment of the present disclosure. The values utilized in FIG. 5 are demonstrative and not limiting. In at least one embodiment, as illustrated in FIG. 5, determining the deployment entropy indicator includes computing 502 a configuration entropy parameter based on a configuration drift value, an environmental inconsistency value, a deployment randomness value, a configuration obsolescence value, and a normalizing constant greater than zero.

The module 206 (FIG. 3) ingests multiple forms of configuration data and telemetry, including drift logs (e.g., diffs between infrastructure-as-code definitions and deployed state), environmental mismatches (e.g., discrepancies between staging and production environments), and deployment irregularities (e.g., unscheduled rollbacks or manual patching events).

For each pipeline run, the module 206 aggregates 504 these observations into one or more submetrics, such as configuration drift values, inconsistency scores, or randomness indicators. These values are normalized by the total number of configuration elements (e.g., environment variables, secrets, Helm values) and combined to produce a deployment entropy score.

As illustrated in FIG. 5, the determined DCE values may be compared 506 by the module 206 against defined entropy bands or ranges 508 indicative of specified entropy states of the deployment pipeline.

Figure 6:
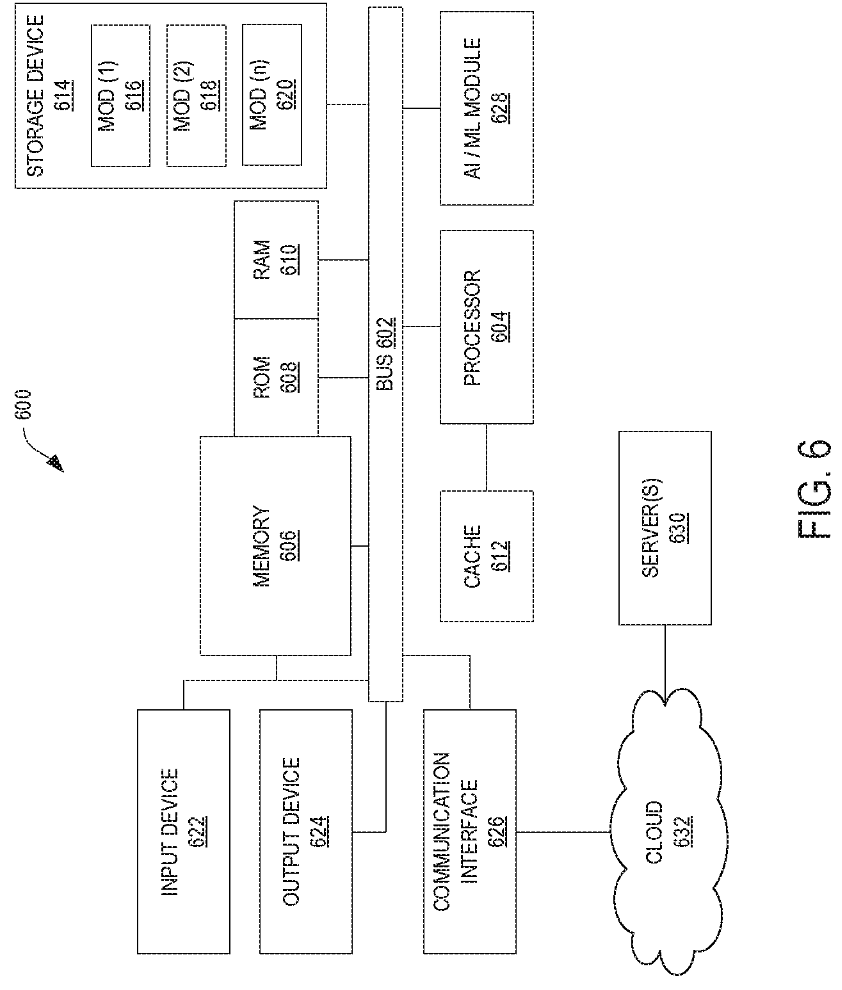
FIG. 6 illustrates an embodiment of a computing hardware environment for a computing system, in accordance with at least one embodiment of the present disclosure.

FIG. 6 illustrates an embodiment of a hardware environment of a computing system 600 for cloud resource deployment, according to at least one aspect of the present disclosure. The hardware environment of the computing system 600 is optimized for implementing the complex operations for methods, workflows, platforms, systems, and modules as described above in connection with FIGS. 1-5, integrating both a robust, modular hardware setup and a detailed processor-based computing system. With reference back to FIG. 6, the components of the hardware environment of the computing system 600 are in communication with each other using a system bus 602. The computing system 600 can include a processing unit 604 (CPU or processor) and the system bus 602 that may couple various system components including the system memory 606, such as a read only memory 608 (ROM) and a random-access memory 610 (RAM), to the processor 604. The computing system 600 can include a cache 612 of high-speed memory connected directly with, in close proximity to, or integrated as part of the processor 604.

The computing system 600 can copy data from the system memory 606, ROM 608, RAM 610, and/or a storage device 614 to the cache 612 for quick access by the processor 604. In this way, the cache 612 can provide a performance boost that avoids processor delays while waiting for data. These and other modules can control the processor 604 to perform various actions. Other system memory 606 may be available for use as well. The system memory 606 can include multiple different types of memory with different performance characteristics. The processor 604 can include any general-purpose processor and a hardware module or software module, such as module (1) 616, module (2) 618, up to module (n) 620 (where n is an integer greater than 2) stored in the storage device 614, to control the processor 604 as well as a special-purpose processor where software instructions are incorporated into the actual processor design. The processor 6045 may essentially be a completely self-contained computing system, containing multiple cores or processors, a system bus, memory controller, cache, etc. A multi-core processor may be symmetric or asymmetric.

To enable user interaction with the computing system 600, an input device 622 can represent any number of input mechanisms, such as a microphone for speech, a touch-protected screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing system 600. The communications interface 626 can govern and manage the user input and system output. There may be no restriction on operating on any particular hardware arrangement and therefore the basic features here may easily be substituted for improved hardware or firmware arrangements as they are developed.

The storage device 614 can be a non-volatile memory and can be a hard disk or other types of computer readable media or storage which can store data that are accessible by a computer, such as magnetic cassettes, flash memory cards, solid state memory devices, digital versatile disks, cartridges, random access memory, read only memory, and hybrids thereof.

As discussed above, the storage device 614 can include the software modules 616, 618, 620 for controlling the processor 604. Other hardware or software modules are contemplated. The storage device 614 can be connected to the system bus 602. In some embodiments, a hardware module that performs a particular function can include a software component stored in a computer-readable medium in connection with the necessary hardware components, such as the processor 604, the system bus 602, the output device 624, and so forth, to carry out the function. For clarity of explanation, in some instances the present technology may be presented as including individual functional blocks including functional blocks comprising devices, device components, steps or routines in a method embodied in software, or combinations of hardware and software.

With reference to both FIG. 6, a high-performance processor 604 coordinates essential functions across memory, storage, data inputs, and external networks via a system bus 602. Equipped with a dedicated cache 612, the processor 604 ensures rapid access and retrieval of critical data, minimizing latency and providing the computational capacity to process complex instructions related to task orchestration, inventory management, and order fulfillment including continuous AI-driven tasks described in connection with FIG. 1-5.

The computing system 600 includes a multi-tiered memory architecture where the system memory 606 includes the ROM 608 and the RAM 610. One aspect of the computing system 600 is its multi-layered storage infrastructure, anchored by the storage device 614. This storage device 614 includes various forms of non-volatile memory, such as solid-state drives (SSDs) and magnetic storage, housing critical data and software modules 616, 618, 620 necessary for controlling the processor 604 and executing operations described in connection with FIG. 1-5, for example. The storage device 614 stores complex software algorithms and machine learning models that analyze historical data and real-time conditions, generating optimized task sequences.

This configuration supports high-speed processing for tasks and data updates essential for dynamic operations for cloud resource cloning. While the ROM 608 provides core operational protocols and configurations, the high-speed RAM 610 enables the system to handle real-time updates to inventory levels, task queues, and predictive analytics. Furthermore, the storage device 614, including SSDs and magnetic storage, houses data and software modules necessary for executing the functions described herein. This storage system retains historical records, operational data, and machine learning models, enabling complex task sequencing and optimized data management.

Artificial intelligence (AI) and machine learning (ML) modules 628 may be embedded within the computing system 600 enable advanced predictive analytics, transforming historical and real-time data into actionable insights. High-performance Tensor Processing Units (TPUs) and Graphical Processing Unites (GPUs), and Central Processing Units (CPUs) support continuous training of AI/ML models. AI-driven algorithms analyze real-time operational data to anticipate potential issues allowing the system 600 to adjust tasks proactively. These AI/ML models 628 are housed on cloud servers 630, enabling parallel processing and providing adaptive, scalable insights across cloud resources or cloud service providers.

Leveraging TPUs, GPUs, and CPUs, the system 600 continuously trains the AI/ML models 628. AI-driven algorithms analyze real-time operational data to enable the system 600 to proactively adjust task allocations and priorities. The AI/ML models 628 are housed on cloud servers, where large datasets can be processed in parallel, providing scalable, adaptive insights to each cloud resource. to improve various processes related to the methods, systems, platforms, and/or modules described in connection with FIGS. 1-5.

A suite of data collection and input/output (I/O) devices may be employed to monitor and interact with the system 200 or components thereof. The input devices 622, including barcode scanners, RFID readers, IoT sensors, touchscreens, and handheld devices, capture real-time data. This data feeds into the processor for seamless integration into the operational database, enabling precise, on-the-fly adjustments. The output devices 624, such as digital displays, wearable alerts, and screens, provide real-time feedback. The range of input and output devices, including the input device 622 and the output device 624, which enable users to interact directly with the system 200 or components thereof. These input devices 622 and output devices 624 provide real-time feedback and facilitate task monitoring, allowing users to stay informed of task progress, and any system updates. The input devices 622 capture real-time data from users and transmit the data to the processor 604, while the output devices 624 display prioritized task sequences, updates on order status, and notifications for operational adjustments.

In various embodiments, the computing system 600 is extended and supported by a cloud-based infrastructure 632, which provides scalable storage, processing power, and data analytics. The cloud-based infrastructure 632 integrates the servers 630 with the computing system 600 to perform one or more portions of the methods 100, 150.

The scalable cloud-based infrastructure 632 also serves as the primary hub for inter-facility communication, linking remote to a central command system that monitors and directs tasks across the network. When additional processing capacity is required, the system can dynamically allocate cloud resources, ensuring that computational workloads related to predictive analytics, complex task sequencing, and resource optimization are handled efficiently. Additionally, data redundancy protocols within the cloud architecture safeguard operational data, ensuring recovery from hardware failure or data loss scenarios.

The computing system 600 may be processor-based. The processor-based computing system 600 may operate within a cloud-enabled, modular hardware environment designed for scalability and high availability. This broader infrastructure includes additional AI-optimized processing units, such as TPUs and GPUs, which are capable of handling the intensive computational requirements of machine learning algorithms used for demand forecasting, slotting optimization, and real-time task adjustments. The modular cloud architecture ensures that each facility can access centralized data and processing power, dynamically adjusting workflows based on system demands. It also allows the orchestration module to allocate resources optimally, whether from central servers or distributed cloud resource-specific processors, depending on task priorities and operational constraints.

The scalable cloud-based infrastructure 632 provides flexible storage, processing, and analytics capabilities across distributed computing environments. Cloud integration supports storage of historical data, remote processing of compute-intensive machine learning models, and real-time data access for multiple facilities. Managed through containerized applications and virtual machines, the cloud framework enables continuous software updates, enhanced disaster recovery, and dynamic resource allocation to accommodate varying operational demands. Cloud-based inter-facility communication ensures synchronized, efficient operations, with additional processing capacity allocated as needed.

The system 200 may include security protocols to provide data integrity, privacy, and compliance with regulatory standards. These include end-to-end encryption, multi-factor authentication, role-based access control, and real-time monitoring via firewalls and intrusion detection systems. An AI-based anomaly detection component monitors access patterns and data consistency, flagging unusual activities. Additionally, encrypted logging and audit trails facilitate transparency and compliance with regulations such as General Data Protection Regulation (GDPR) for data privacy, while data sovereignty protocols ensure that sensitive information meets regional compliance standards.

This computing system 600 represents an end-to-end, cloud-based server system that is adaptive and integrates AI-driven analytics, real-time data capture, robust security measures, and scalable cloud resources. The processor 604, memory modules, storage devices, and I/O components collectively enable data-driven decision-making, adjusting tasks in real time to respond to changing demands. Data flows seamlessly from cloud storage and I/O devices to the central processor, dynamically orchestrating resources to provide real-time updates to staff, maintain efficiency, and optimize performance across facilities. This robust, secure, and compliant system is designed to streamline operations, improve responsiveness, and support scalable growth in diverse logistics environments.

The computing system 600 of one or more computers perform particular operations or actions by virtue of having software, firmware, hardware, or a combination of them installed on the system that in operation causes or cause the system to perform the actions. One or more computer programs perform particular operations or actions by virtue of including instructions that, when executed by data processing apparatus, cause the apparatus to perform the actions.

Within the context of this disclosure, the term "module" is used as a broad and flexible term to describe components of various systems disclosed herein, e.g., system 200, that may be implemented in hardware, software, firmware, or any combination thereof to accomplish one or more defined tasks or operations.

A hardware module may be a physical device or circuit designed to execute predefined functions. Examples include processors—central processing units (CPUs), digital signal processors (DSPs), graphics processing units (GPUs)—as well as memory devices (RAM, ROM, flash), network interfaces, power-management circuitry, and specialized devices such as application-specific integrated circuits (ASICs) or field-programmable gate arrays (FPGAs). These elements may communicate over buses, networks, or other interfaces that provide the bandwidth necessary for high-speed data transfer and operation.

A software module includes instructions stored in memory and executed by one or more processing units. Such modules may take the form of executable code, dynamic-link libraries (DLLs), software-development kits (SDKs), virtual-machine environments, or full applications. They implement algorithms, data processing, decision logic, and user-interface functionality, may be written in languages such as C++, Python, or Java, and may interact with peer modules through well-defined application-programming interfaces (APIs), middleware, or cloud services.

A firmware module includes low-level code stored in non-volatile memory (e.g., EEPROM or flash) that bridges hardware and higher-level software. Firmware provides the control logic required to configure, initialize, and manage hardware devices, handling tasks such as bootstrapping, protocol management, and power control. Firmware updates may be delivered remotely, allowing post-deployment enhancements and security patches without altering hardware.

Modules may communicate with one another via inter-process communication (IPC), message passing, remote procedure calls (RPC), or data buses. APIs, middleware layers, or network protocols (e.g., REST or gRPC) facilitate seamless interaction regardless of each module's underlying implementation, enabling distributed operation across local or networked environments.

The architecture embraces a plug-and-play approach, enabling modules to be added, removed, or modified dynamically. Such modularity may promote horizontal scaling—by deploying additional modules to increase parallel capacity—or vertical scaling—by augmenting individual modules with enhanced capabilities. This flexibility is particularly advantageous in distributed-computing contexts, including cloud platforms and multi-core processors.

Modules may support multithreading, parallel execution, or distributed computing in which tasks are partitioned across multiple hardware resources such as multi-core processors or distributed nodes. Load-balancing and task-synchronization mechanisms help ensure efficient resource utilization and reduced execution times for complex workloads.

Where appropriate, modules may integrate AI-driven components, including machine-learning models or neural networks that perform pattern recognition, decision making, or predictive analytics. Such AI modules may rely on pre-trained models or continuous learning and may exploit specialized accelerators—such as TPUs or GPUs—to achieve high performance.

For time-sensitive applications, modules may employ real-time processing capabilities such as low-latency execution, task prioritization, and event-driven architectures. Real-time operating systems (RTOS) or dedicated task schedulers within firmware or software modules help guarantee that critical operations meet specified deadlines.

Security features may be embedded at both hardware and software levels, including encryption, authentication, and access control to protect data and maintain operational integrity. Secure hardware elements—such as trusted-platform modules (TPMs) or secure enclaves—may store cryptographic keys and execute guarded operations, while software modules may implement firewalls, intrusion-detection systems (IDS), or secure-communication protocols such as TLS/SSL.

Modules may manage data through embedded databases, cloud-storage services, or other persistence mechanisms, and may synchronize data across distributed systems using version control, replication strategies, and consistency models ranging from eventual to strong consistency.

The described modules may be equally suitable for cloud deployments and edge-computing frameworks. In the cloud, a module may scale elastically with demand, whereas at the edge it may perform latency-sensitive processing close to the data source, thereby reducing reliance on centralized resources.

In power-constrained environments—such as Internet-of-Things (IoT) devices or battery-operated systems—modules may adopt energy-efficient designs that incorporate power-aware algorithms, dynamic voltage scaling, sleep states, or energy-harvesting technologies. Hardware modules may exploit semiconductor processes optimized for low energy consumption.

Each module may function as an independent, reusable component within the overall system architecture while remaining interoperable with peer modules. This approach affords flexibility, facilitates upgrades and maintenance, and supports deployment on dedicated hardware, within virtualized environments, or across distributed networks—all while delivering the comprehensive functionality described herein.

In certain embodiments, the computer-readable storage devices, media, and memories may include wired or wireless signals that convey a bit stream or similar constructs. However, when the phrase "non-transitory computer-readable storage media" is used, it expressly excludes forms such as energy, carrier signals, electromagnetic waves, and signals per se.

The methods described herein may be realized through computer-executable instructions stored on, or otherwise made available by, computer-readable media. Such instructions may configure a general-purpose computer, a special-purpose computer, or a dedicated processing device to execute one or more of the functions outlined above. Portions of the required computing resources may reside on, and be accessed through, a network. The instructions themselves may be provided as binaries, intermediate-format instructions such as assembly language, firmware, or source code. Suitable computer-readable media include magnetic or optical storage, flash memory, USB devices equipped with non-volatile memory, and network-attached storage devices, among others.

Devices that implement these methods may combine hardware, firmware, and/or software and may assume a variety of form factors, including laptops, smartphones, small-form-factor personal computers, personal digital assistants, rack-mount appliances, and standalone units. Equivalent functionality may also be embodied in peripherals or add-in cards, or distributed across multiple chips or processes within a single device.

The instructions, the media that convey those instructions, the computing resources that execute them, and the supporting structures together constitute means for providing the functionality described in this disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for dynamically orchestrating a deployment pipeline for deploying a cloud application, wherein the deployment pipeline comprises deployment stages each configured to perform one or more deployment operations, the computer-implemented method comprising:

monitoring operational metrics of the deployment pipeline, the operational metrics indicative of an operational behavior of the deployment pipeline;

determining deployment entropy values indicative of a disorder level within the deployment pipeline, wherein the deployment entropy values are based on temporal variances in the monitored operational metrics associated with the deployment stages of the deployment pipeline;

evaluating the deployment entropy values against entropy bands associated with a set of action-selection criteria; and executing an adaptive pipeline pathing of the cloud application through the plurality of deployment stages by selecting and executing deployment control actions based on the evaluation of the deployment entropy values against the entropy bands;

wherein computing the deployment entropy values comprises applying an equation defined as:

$$DEV = (CD + EI + DR + CO) / N$$

wherein DEV is the Deployment Entropy value, CD is Configuration Drift Value, EI is an environmental inconsistency value, DR is a deployment randomness value, CO is a configuration obsolescence value, and N is a normalizing constant greater than zero.

2. The computer-implemented method of claim 1, wherein the operational metrics comprise at least one of:

a deployment latency value for each deployment stage; or a failure rate computed based on success or error outcomes associated with the deployments stages of the deployment pipeline.

3. The computer-implemented method of claim 1, wherein the deployment control actions comprise at least one of:

adjusting a concurrency level for deployment tasks;

modifying a retry interval for failure-prone stages; or reordering execution of non-dependent deployment stages to reduce end-to-end latency.

4. The computer-implemented method of claim 1, wherein determining the deployment entropy values comprises:

determining a configuration drift value indicative of inconsistencies across multiple of the deployment stages of the deployment pipeline.

5. The computer-implemented method of claim 1, wherein determining the deployment entropy values comprises:

determining an environmental inconsistency value (EI) indicative of defects or test failures repeating in one or more of the deployment stages of the deployment pipeline.

6. The computer-implemented method of claim 1, wherein determining the deployment entropy values comprises:

determining a deployment randomness value (DR) indicative of a count of deployments that fail reproducibility from a common source commit.

7. The computer-implemented method of claim 1, wherein determining the deployment entropy values comprises:

determining a configuration obsolescence value (CO) indicative of outdated, hardcoded, or deprecated configuration patterns in the deployment pipeline.

8. The computer-implemented method of claim 1, wherein the deployment control actions comprise at least one of:

pausing deployment;

executing defined and quantified retries;

accelerating deployment;

initiating rollback to a prior stable deployment stage;

adjusting deployment parameters for subsequent deployment stages; or invoking a canary deployment for a subset of target environments based on a deployment entropy value deviating from a dynamically adjustable threshold by a first margin.

9. The computer-implemented method of claim 1, wherein the monitored operational metrics are indicative of at least one of:

inconsistencies across multiple of the deployment stages of the deployment pipeline;

defects or test failures repeating in one or more of the deployment stages of the deployment pipeline;

a count of deployments that fail reproducibility from a common source commit; or outdated, hardcoded, or deprecated configuration patterns in the deployment pipeline.

10. The computer-implemented method of claim 1, further comprising:

obtaining dependency data indicative of relationships among components of the deployment pipeline; and determining a coupling value based on the dependency data; and wherein executing an adaptive pipeline pathing of the cloud application is further based on the coupling value.

11. The computer-implemented method of claim 10, wherein the dependency data comprises:

a direct dependency parameter indicative of direct service-to-service or service-to-tool references among components of the deployment pipeline, wherein the direct dependency parameter is based on the obtained dependency data.

12. The computer-implemented method of claim 10, wherein the dependency data comprises:

an environment touch parameter indicative of distinct deployment environments affected by changes to at least one of the components of the deployment pipeline.

13. The computer-implemented method of claim 10, wherein the dependency data comprises:

a test linkage parameter indicative of integration or end-to-end test cases referencing two or more of the components of the deployment pipeline.

14. The computer-implemented method of claim 10, wherein the dependency data comprises:

an infrastructure component parameter indicative of infrastructure resources, including at least one of databases, message buses, or storage buckets, associated with the components of the deployment pipeline.

15. The computer-implemented method of claim 10, wherein the dependency data comprises:

a configuration alignment parameter indicative of shared configuration parameters or feature-flag values concurrently referenced by two or more of the components of the deployment pipeline.

* * * * *